3,293,256
PROCESS FOR PREPARING STABLE FREE
PYRIDINIUM RADICALS
Edward M. Kosower, Syosset, N.Y., and Edward J. Poziomek, Edgewood, Md., assignors to the United States of America as represented by the Secretary of the Army
No Drawing. Filed July 7, 1964, Ser. No. 380,963
3 Claims. (Cl. 260—295)

This invention relates to a method for the preparation of stable free radicals of the type

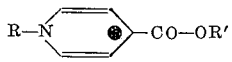

where R is an alkyl group of 1 to 4 carbon atoms such as methyl, ethyl, n-propyl, and n-butyl groups; an aralkyl group of 7–10 carbon atoms such as benzyl, phenethyl, phenylpropyl groups; an aryl radical of 6–7 carbon atoms such as phenyl and (o, m, and p) tolyl groups and where R' is a lower alkyl group of 1–4 carbon atoms such as the methyl, ethyl, n-propyl and n-butyl groups.

The process consists of the metallic reduction of a pyridinium salt corresponding to the above in the absence of oxygen. The anion portion of the salt can be a bromine, chlorine, iodine, or toluene sulfonate moieties. The reduction is carried out in the presence of a finely divided metal such as sodium, zinc, magnesium, or aluminum and in the presence of an inert organic low boiling solvent at a temperature in the range of 0–30° C.

The reaction vessel for the reduction together with its associated side flask or U tubes is evacuated to a pressure in the range $10^{-5}$ to $10^{-8}$ mm. Hg with $10^{-6}$ to $10^{-7}$ mm. Hg being the preferred range. After the evacuation, the solvent is distilled into the closed system and the pyridinium salt and the finely divided metal are stirred at a temperature in the range of 0–30° C. for a period of 2–3 hours. After distillation of the solvent into a trap outside of the closed system, the high vacuum is reapplied and the desired free radical can be distilled from the reaction residue into the side flask or U tube merely by applying liquid nitrogen to these elements. We have found that it is desirable but not essential to extract the reaction residue with a saturated acyclic hydrocarbon solvent before the free radical is finally distilled and isolated in the pure form.

The existence of stable free radicals has been reported in the literature previously. The patent to Coppinger (Patent No. 3,004,042) discloses the preparation of the free radical of bis (di-tert-alkyl-hydroxy-phenyl) amines. Schwarz et al., in the Journal of the American Chemical Society, volume 83, page 3164 (1961) have reported the detection of pyridyl free radicals after the electroreduction of N-alkyl pyridinium salts.

Our invention is a distinct improvement in the process set forth by Schwarz et al. in that we isolated the pure pyridinyl free radical in yields of 2–15%.

We have found that the free radicals set forth above are extremely reactive with oxygen but are stable at 25° C. in an inert atmosphere. Thus, the use of these radicals is indicated in polymerization processes where free radical catalysts are used. Examples of such processes are given in the patent to Larchar et al. 2,816,883 dated December 17, 1957.

The following examples are illustrative of our invention.

*Example 1*

Into a reaction flask equipped with two U tubes in series 12.3 g. of 1-ethyl-4-carbomethoxypyridinium iodide and 1.36 g. of 20 mesh zinc were placed with a magnetic stirrer bar. This was connected to a high vacuum pump and pumped on for 2½ hours to check for leaks and to degas the equipment. The pressure in the flask was found to be $5 \times 10^{-6}$ to $1 \times 10^{-7}$ mm. Hg. Then freshly degassed acetonitrile (35 ml.) was allowed to distill into the cooled (0–5° C.) reaction flask. The mixture was magnetically stirred for 2½ hours at this temperature and pressure. The color of the mixture was a dull green after this period of time. The solvent was then distilled into a trap in the high vacuum apparatus. The greenish-black residue was pumped on for five minutes. A Dewar flask containing liquid nitrogen was placed under the U tube nearest the reaction flask. A water bath was then placed under the reaction flask and distillation was allowed to proceed for one hour. The liquid nitrogen was placed then under the next U tube (equipped with a 4 mm. receiver tube). The distillate in the first U tube was then warmed with 80–90° C. hot air. The desired free radical condensed in the cooled U tube as a sapphire blue solid. After warming to room temperature, the product was an emerald green liquid and flowed into the receiver tube. This tube was then sealed off and the product analyzed.

Calculated for $C_{19}H_{12}NO_2$: C, 65.03; H, 7.29; N, 8.43; O, 19.25. Found: C, 64.20, 64.44; H, 805, 7.84; N, 8.52, 8.25; O, 19.34, 19.80.

*Example 2*

In this example, a reaction flask was placed in series with a second flask and a U tube with a receiver. Into the reaction flask 3.89 g. of 1-ethyl-4-carbomethoxypyridinium iodide and .433 g. of 20 mesh zinc were sealed into the reaction flask with a magnetic stirrer bar. The reactants were pumped on for 1½ hours, by means of a high vacuum pump, to the same pressure as before. Freshly degassed acetonitrile (35 ml.) was allowed to distil into the reaction flask cooled in an ice bath. The mixture immediately turned bright green and was stirred magnetically at 0–5° C. for 1½ hours. The acetonitrile was then distilled off into a trap in the high vacuum apparatus. The residue was pumped on for fifteen minutes. Freshly degassed n-heptane (10 ml.) was then distilled into the reaction flask.

The apparatus was then sealed and disconnected from the vacuum line. The extract from the reaction flask was poured into the second flask and the n-heptane was condensed back into the reaction flask by merely placing the flask in a liquid nitrogen bath. After about twenty extractions, the apparatus was re-attached to the high vacuum line and the solvent was evaporated into a solvent trap. The U tube was then placed in a liquid nitrogen bath and the second flask containing the extract was warmed with hot air. 1-ethyl-4-carbomethoxy-pyridinyl appeared as a blue solid on the sides of the U tube. After five minutes, the heating was discontinued. It was found that upon removal of the liquid nitrogen, the blue solid turned into a green liquid and flowed into the receiver of the U tube. The yield of the free radical varied from 2–15% depending upon the number of extractions. We found that three or four extractions performed as rapidly as possible usually gave the highest yields.

We have performed similar procedures using finely divided sodium, magnesium and aluminum with essentially the same results.

Other inert organic low boiling solvents may be used in place of the acetonitrile. These can be pyridine, methyl acetate, dimethylformamide and others of a similar nature.

The starting materials which can be used in our process are selected from the following classes: 1-alkyl-4-carboalkoxy-pyridinium iodide, chloride, bromide or tosylate; 1-aralkyl-4-carboalkoxy pyridinium iodide, chloride, bromide or tosylate; 1-aryl-4-carboalkoxy pyridinium iodide, chloride, bromide or tosylate. Obviously, other starting materials such as isomers and homologs of the suggested classes may be used. The only requirement being that the free radical derived from the above quaternary salts must be distillable under the conditions of our reaction.

In the extraction step, a saturated acyclic hydrocarbon solven is used such as n-heptane. Obviously, other hydrocarbons such as hexane and octanes or mixtures thereof may be used with equally good results.

We claim:
1. In a method for the preparation of stable free radicals of the formula

where R is selected from the group consisting of alkyl radicals of 1–4 carbons, aralkyl radicals of 7–10 carbons and aryl radicals of 6–7 carbons and where R' is a lower alkyl group of 1–4 carbons which comprises the steps of
 (a) stirring in a high vacuum a compound of the formula:

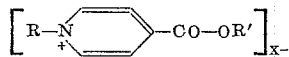

where R and R' is the same as before and X⁻ is a radical selected from the group consisting of iodide, bromide, chloride and toluene sulfonic acid radicals with a finely divided metal of the group consisting of zinc, sodium, magnesium and aluminum in an inert organic solvent at a temperature in the range 0–30° C.;
 (b) separating the residue from the solvent;
 (c) the improvement which consists of distilling the residue into a liquid nitrogen trap whereby an improved yield of said free radicals is obtained.

2. The method as set forth in claim 1 in which the residue is extracted with a acyclic hydrocarbon solvent and the extract is distilled.

3. In a method for the preparation of the free radical 1-ethyl-4-carbomethoxy-pyridinyl which comprises:
 (a) stirring, in a high vacuum, 1-ethyl-4-carbomethoxy-pyridinium iodide and finely divided zinc in a solvent of acetonitrile;
 (b) separating the residue from the solvent;
 (c) extracting the residue with n-heptane;
 (d) the improvement which consists of distilling the extract under the same high vacuum to whereby an improved yield of said free radical is obtained.

References Cited by the Examiner
UNITED STATES PATENTS 2,816,883  12/1957  Larchar et al. _____ 260—94.9
3,004,042  10/1961  Coppinger _____ 260—396

OTHER REFERENCES

Schwarz et al.: J. Amer. Chem. Soc., vol. 83, pp. 3164–65 (1961).

Wallenfels et al.: Analen Der Chemie, vol. 621, pp. 198–214 (1958).

Wallenfels et al.: Chem. Ber., vol. 92, pp. 1406–1422 (1959).

WALTER A. MODANCE, *Primary Examiner.*

A. L. ROTMAN, *Assistant Examiner.*